(12) United States Patent
Brewer et al.

(10) Patent No.: US 10,148,706 B2
(45) Date of Patent: Dec. 4, 2018

(54) SYSTEMS AND METHODS FOR INGRESS CALL FILTERING

(71) Applicant: PEERLESS NETWORK, INC., Chicago, IL (US)

(72) Inventors: James E. Brewer, Chicago, IL (US); Jeffrey S. Wall, Dallas, TX (US)

(73) Assignee: PEERLESS NETWORK, INC., Chicago, IL (US)

( * ) Notice: Subject to any disclaimer, the term of this patent is extended or adjusted under 35 U.S.C. 154(b) by 487 days.

(21) Appl. No.: 14/593,738

(22) Filed: Jan. 9, 2015

(65) Prior Publication Data

US 2016/0036868 A1 Feb. 4, 2016

Related U.S. Application Data

(60) Provisional application No. 62/030,873, filed on Jul. 30, 2014.

(51) Int. Cl.
| | |
|---|---|
| *H04L 29/06* | (2006.01) |
| *H04M 3/42* | (2006.01) |
| *H04M 3/22* | (2006.01) |
| *H04M 7/12* | (2006.01) |
| *H04M 15/00* | (2006.01) |
| *H04Q 3/62* | (2006.01) |
| *H04M 3/38* | (2006.01) |
| *H04Q 3/66* | (2006.01) |

(52) U.S. Cl.
CPC ...... *H04L 65/1076* (2013.01); *H04L 65/1053* (2013.01); *H04M 3/2218* (2013.01); *H04M 3/2281* (2013.01); *H04M 3/38* (2013.01); *H04M 3/42238* (2013.01); *H04M 3/42314* (2013.01); *H04M 7/123* (2013.01); *H04M 7/1275* (2013.01); *H04M 7/1285* (2013.01); *H04M 15/50* (2013.01); *H04M 15/8228* (2013.01); *H04M 15/881* (2013.01); *H04Q 3/62* (2013.01); *H04Q 3/66* (2013.01)

(58) Field of Classification Search
CPC ........................ H04L 65/1076; H04L 65/1053
See application file for complete search history.

(56) References Cited

U.S. PATENT DOCUMENTS

| | | | |
|---|---|---|---|
| 7,502,447 | B2 | 3/2009 | McCormick et al. |
| 7,626,929 | B2 | 12/2009 | Mallesan |
| 7,725,708 | B2 | 5/2010 | Wu et al. |
| 8,085,758 | B2 | 12/2011 | Ramachandran et al. |

(Continued)

OTHER PUBLICATIONS

Genband, "Over the Top Solution for Service Providers", www.genband.com, 2013.

*Primary Examiner* — Feben Haile
(74) *Attorney, Agent, or Firm* — Marshall, Gerstein & Borun LLP; Randall G. Rueth (57) ABSTRACT

An ingress call filter system enables real-time or near real-time efficiencies of an inter-carrier switch. The ingress call filter determines if a received call to a called party is likely to fail. If the call is likely to fail, the ingress call filter returns an indication that the call should be filtered or rejected. If the call in not likely to fail, the ingress call filter returns an indication that a call router should attempt to establish the call. Such techniques mitigate penalties assessed to the inter-carrier network for incomplete or failed calls in real time or near real time.

22 Claims, 7 Drawing Sheets

(56) References Cited

U.S. PATENT DOCUMENTS

| | | | | |
|---|---|---|---|---|
| 8,284,765 | B1* | 10/2012 | Kell | H04M 3/42238 |
| | | | | 370/352 |
| 8,488,479 | B2* | 7/2013 | Li | H04L 65/1079 |
| | | | | 370/252 |
| 8,634,520 | B1 | 1/2014 | Morrison et al. | |
| 8,699,681 | B2 | 4/2014 | Croak et al. | |
| 8,755,371 | B2 | 6/2014 | Ramachandran et al. | |
| 2009/0086953 | A1* | 4/2009 | Vendrow | H04M 3/436 |
| | | | | 379/207.02 |
| 2009/0268882 | A1* | 10/2009 | Lee | H04M 3/5158 |
| | | | | 379/88.02 |
| 2012/0287924 | A1* | 11/2012 | Sterman | H04L 12/66 |
| | | | | 370/352 |
| 2013/0223605 | A1* | 8/2013 | Statham | H04M 3/10 |
| | | | | 379/201.02 |
| 2014/0105373 | A1 | 4/2014 | Sharpe | |
| 2014/0215082 | A1* | 7/2014 | Backholm | H04L 65/4084 |
| | | | | 709/227 |

* cited by examiner

SYSTEMS AND METHODS FOR INGRESS CALL FILTERING

CROSS-REFERENCE TO RELATED APPLICATIONS

This is a non-provisional patent application that claims priority to and the benefit of the filing date of U.S. Provisional Patent Application No. 62/030,873, entitled "Efficient Private Inter-Carrier Network Switching" and filed on Jul. 30, 2014, the disclosure of which is hereby incorporated by reference in its entirety. Additionally, the present disclosure hereby incorporates by reference, in its entirety, U.S. patent application Ser. No. 12/469,454, entitled "System and Method of Providing Communication Service Using a Private Packet Network Backbone Exchange" filed May 20, 2009, which issued on Oct. 9, 2012 as U.S. Pat. No. 8,284,765.

TECHNICAL FIELD

The following disclosure relates to systems and methods for filtering inbound calls, and in particular, filtering inbound calls to a private packet backbone exchange that are likely to fail upon attempting a connection to a called party.

BACKGROUND

In today's telephony and communication networks, inter-carrier switches or networks provide connections between various networks corresponding to various communications carriers. Long distance termination providers, for example, may utilize an inter-carrier switch to provide connections between carriers corresponding to calling parties and various other interconnected carriers corresponding to called parties. In such cases, the inter-carrier network is likely connected to multiple exchanges for completing calls to a calling party provider, which exchanges may allow the inter-carrier network to employ various termination routes, for example, based on cost and/or other criteria.

Vendors operating the multiple exchanges connected to an inter-carrier network may assess a variety of surcharges based on certain performance metrics associated with the inter-carrier network. Often, vendors operating exchanges charge inter-carrier networks fees based on a number or percentage of calls to unallocated, or otherwise invalid, phone numbers, that have been routed to the exchanges from the inter-carrier network. As such, the routing of many calls to unallocated numbers via an inter-carrier network can be very costly.

SUMMARY OF THE DISCLOSURE

In an embodiment, a method may include obtaining, by an ingress call filter, cached signaling information indicative of a plurality of calls, wherein each of the plurality of calls failed to connect to a respective called party. The method may include receiving, at the ingress call filter from a call router, a query indicating a newly called party, wherein the query corresponds to a request from a calling party to establish a new call between the calling party and the newly called party. In response to receiving the query, the method may include analyzing, by the ingress call filter, the received cached signaling information to determine if the newly called party is indicated in the received cached signaling information. Based on the analysis of the received cached signaling information, the method may include one of (i) generating, by the ingress call filter, an indication that the new call should be completed, wherein the indication is communicated to the computer device configured to route calls, or (ii) generating, by the ingress call filter, an indication that the new call should not be completed, wherein the indication is communicated to the computer device configured to route calls.

In an embodiment, a method may include receiving, from a first provider corresponding to a first calling party, a request to establish a connection with a called party. Based on the request from the first provider, the method may include generating, by a call router, a query to be transmitted from the call router to an ingress call filter, wherein the query indicates the called party. In response to submitting the query to the ingress call filter, the method may include receiving, from the ingress call filter, an indication that the connection with the called party is to be filtered. Based on the indication that the connection with the called party is to be filtered and without establishing the connection with the called party, the method may include generating, by the call router, a message to be returned to the first provider corresponding to the calling party, wherein the message indicates that the connection with the called party was not established.

In an embodiment, a system for filtering calls that are likely to fail may include a data storage unit storing information indicative of a plurality of calls, wherein each of the plurality of calls failed to connect to a respective called party, and wherein the data storage unit stores a portion of the information indicative of the plurality of calls corresponding to each of the plurality of calls for a length of time indicated by a respective time-to-live value before the portion is removed from the data storage unit. Further, the system may include an access mechanism to access the information indicative of the plurality of calls stored on the data storage unit and an ingress call filter configured to, upon receiving queries from a call router, access, by the access mechanism, the information indicative of the plurality of calls to determine whether attempted connections routed by the call router are to be filtered. The call router communicatively coupled to the ingress call filter, may be configured to receive, from a call provider corresponding to a calling party, a request to establish a connection with a particular called party. Based on the request, the call router may be configured to generate a particular query to be transmitted to the ingress call filter, wherein the particular query indicates the particular called party. In response to transmitting the particular query to the ingress call filter, the call router may be configured to receive, from the ingress call filter, an indication that the connection with the particular called party is to be filtered. Based on the indication that the connection with the particular called party is to be filtered, the call router may be configured to generate a message to be transmitted to the call provider, wherein the message indicates that the connection with the particular called party was not established.

In an embodiment, a system for filtering calls that are likely to fail may include a data storage unit storing information indicative of a plurality of calls, wherein each of the plurality of calls failed to connect to a respective called party, and wherein the data storage unit stores a portion of the information indicative of the plurality of calls corresponding to each of the plurality of calls for a length of time indicated by a respective time-to-live value before the portion is removed from the data storage unit. Further, the system may include an access mechanism to access the information indicative of the plurality of calls stored on the data storage unit and a call router communicatively coupled to an ingress call filter. The ingress call filter may be configured to obtain, from the data storage unit, the stored information indicative of a plurality of calls. The ingress call filter may be further configured to receive, from the call router, a query indicating a newly called party, wherein the query corresponds to a request from a calling party to establish a new call between the calling party and the newly called party. In response to receiving the query, the ingress call filter may be configured to analyze the obtained information indicative of a plurality of calls to determine if the newly called party is indicated in the received cached signaling information. Based on the analysis of the obtained information indicative of a plurality of calls, the ingress call filter may be configured to perform one of (i) generate, an indication that the new call should be completed, wherein the indication is communicated to the call router, or (ii) generate, an indication that the new call should not be completed, wherein the indication is communicated to the call router.

DETAILED DESCRIPTION

It should be understood that, unless a term is expressly defined in this patent using the sentence "As used herein, the term '___13 13 13 13 13' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Figure 1:
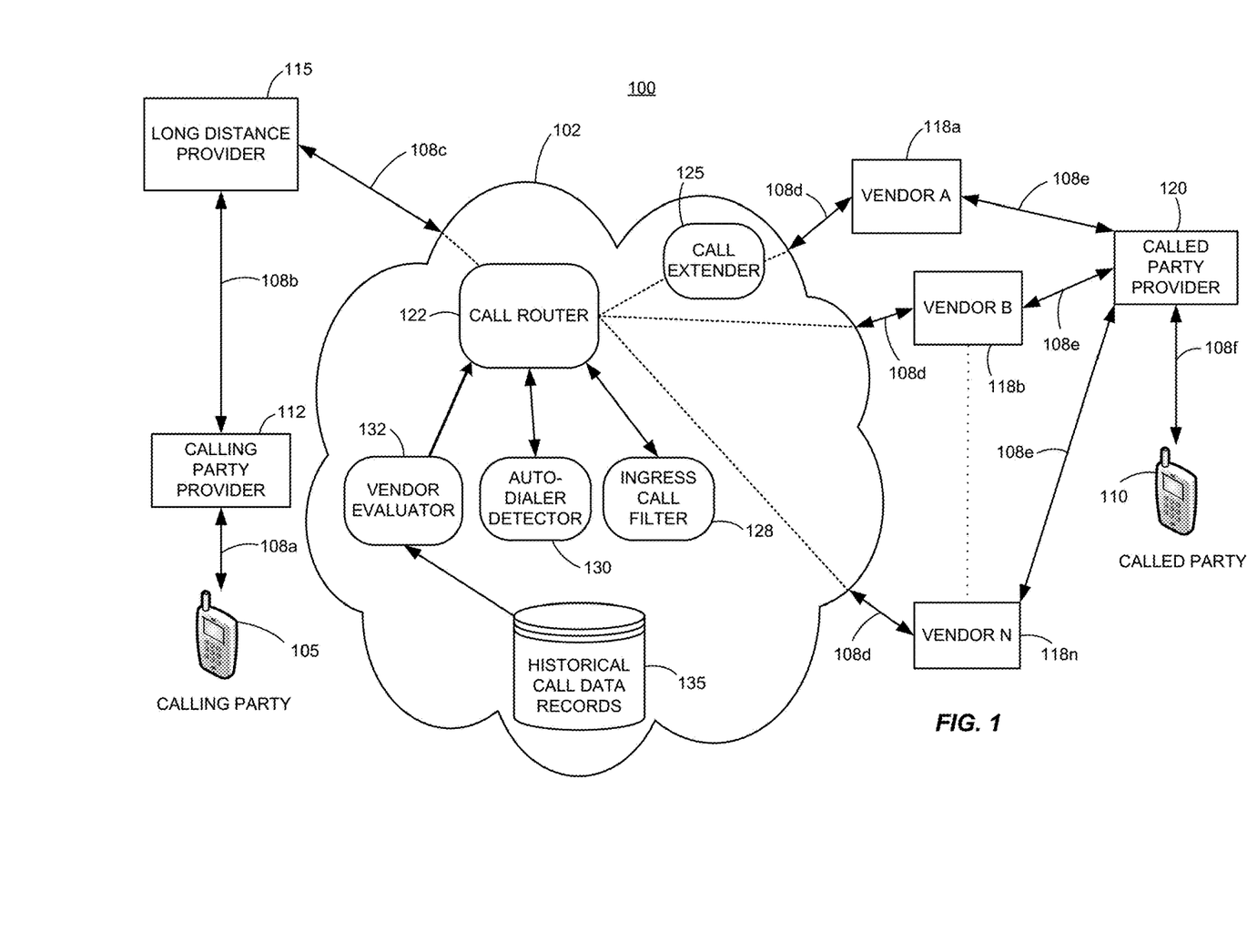
FIG. 1 depicts an embodiment of a communication system that supports switching filtering of inbound calls.

FIG. 1 illustrates a block diagram of an embodiment of a communication system 100 that supports inter-carrier switching and a filtering of inbound calls to an inter-carrier network exchange 102. In particular, the system 100 supports a filtering of inbound calls that are likely to fail upon attempting to complete the calls to respective called parties. The system 100 may analyze cached signaling information to determine whether an inbound call is likely to fail, wherein the cached signaling information indicates previously failed calls within a certain time window (or "time to live" in the cache). Data storage devices of the system 100 may store portions of the cached signaling information during respective time windows, and the time windows, or times-to-live, may be selectively configured such that the filtering of the system 100 is adjustable for certain sources of calls (e.g., calling party providers), for certain types of signaling information, etc. When the system 100 attempts to complete a call but fails, the system 100 may store signaling information detailing the failure (e.g., by certain cause codes) to inform future filtering of inbound calls.

The system 100 may include the inter-carrier network exchange 102 (also interchangeably referred to herein as an exchange, switching exchange, switch, or network 102). A calling party 105 may originate a voice or data call 108 that is destined for a called party 110. The originating call may be initially serviced (as indicated by a reference 108a) by a last-mile switch, system, exchange or network 112 (referred to as a "calling party provider" 112 herein) of the communications service provider or carrier of the calling party 105. In the example scenario shown in FIG. 1, the call 108 is a long-distance call, and, as such, the calling provider service provider network 112 may connect with a long distance provider or carrier network 115 to deliver the call (as illustrated in FIG. 1 by a reference 108b), and the long distance provider network 115 may connect with the inter-carrier network exchange 102 to continue delivery of the call (as illustrated in FIG. 1 by a reference 108c) towards the called party 110.

The inter-carrier network exchange 102 may be connected to multiple vendor switches, systems, networks or exchanges 118a-118n (e.g., generally referred to herein as "vendors" or "exchanges" 118a-118n), each of which may provide subsequent connectivity towards the called party 110, and at least some of which may be provided by different communication vendors, service providers, or carriers. A call router 122 of the inter-carrier network exchange 102 may receive the originating call (reference 108c), select one of the vendors or carriers 118a-118n, and connect the call 108 to the selected vendor network 118a-118n (e.g., via selected routes represented by dashed lines within the switch 102 and by a reference 108d). In an embodiment, the call router 122 may select or determine the outgoing or terminating vendor 118a-118n based on least cost routing (LCR), and/or based on other desired criteria. In the example scenario shown in FIG. 1, each vendor exchange or network 118a-118n may connect to a last-mile switch, system, exchange or network 120 of a communications service provider or carrier of the called party 110. Accordingly, the selected vendor 118a-118n may connect the call 108 to the exchange 120 of the last-mile service provider of the called party (as indicated in FIG. 1 by a reference 108e), and the last-mile provider 120 of the called party 110 may complete the call 108 to the device of the called party 110 (as indicated in FIG. 1 by a reference 108f).

The immediately preceding exchange, provider, or network may rely on or request the inter-carrier network exchange 102 to route or forward a call on behalf of the immediately preceding network (e.g., by utilizing least cost routing and/or some other criteria). As such, the exchange, provider, or network immediately preceding the inter-carrier network switch or exchange 102 in the call scenario may be a customer of the inter-carrier network switch or exchange 102. For example, in a call scenario which may occur in the communication system 100 depicted in FIG. 1, the long distance provider 115 is a customer of the inter-carrier network exchange 102. In some arrangements, the inter-carrier network exchange 102 may service multiple different customers (not shown), and may route calls on their behalf.

It is noted that the call scenario described above and indicated in FIG. 1 is exemplary only, and the communications system 100 (and the inter-carrier switch 102 in particular) may support other types of call scenarios. For example, in some scenarios, the call 108 may not be a long distance call, and thus the long-distance termination provider network 115 may be omitted from servicing the call 108. In some scenarios, each vendor 118a-118n may provide last-mile connectivity directly to the called party device 110, and thus the called party provider network exchange 102 may be omitted from servicing the call 108. In some scenarios, one or more tandem exchanges or networks (not shown) may service the call 108 prior to its entry into the inter-carrier network exchange 102 and/or after its exit from the inter-carrier network exchange 102.

Generally, any of the exchanges 112, 115, 118a-118n, 120 other than the inter-carrier network exchange 102 may be a private exchange or network, or may be a public exchange or network. Furthermore, any of the exchanges 112, 115, 118a-118n and 120 other than the inter-carrier network exchange 102 may be a data network and/or may be a communications network. For example, one or more of the exchanges 112, 115, 118a-118n, 120 may be included in the PSTN (Public Switched Telephone Network), or one or more of the exchanges 112, 115, 118a-118n, 120 may be a data network, and/or may include the Internet.

On the other hand, the inter-carrier network exchange 102 may be a private exchange. For example, the inter-carrier network exchange 102 may be a private packet network backbone exchange (PPNBE). A PPNBE may serve as a single logical switch for providing "one-hop" routing between carriers, and may include a private Internet Protocol (IP) backbone or network comprising privately managed nodes via which packet call traffic may be routed. Such a private network backbone does not include the public Internet and is privately managed, and consequently, the number of nodes and routing priorities of packets within the network exchange may be engineered and controlled to maximize call quality and minimize delay. Furthermore, as the backbone of the network exchange is not the public Internet and is privately managed, the access, security and privacy of calls serviced by the PPNBE are more easily controlled. An example of such a PPNBE may be found in aforementioned U.S. application Ser. No. 12/469,454, now issued as U.S. Pat. No. 8,284,765.

Each of the calling party device 105 and the called party device 110 may be a particular CPE (Customer Premises Equipment) such as a communications device and/or computing device, which may or may not be mobile. A CPE may be, for example, a landline phone, a computer, a tablet, a smart phone, a wireless device, or other device used to originate and/or terminate voice and/or data calls. In some cases, the calling party device 105 and/or the called party device 110 each may comprise multiple devices that have a logical appearance as a single device. For example, the calling party device 105 and/or the called party device 108 may be a private branch exchange (PBX), a virtual private network (VPN), or other private exchange. In some cases, the called party device 108 may be a communications service such as a conference call service, a voting or preference-indicating service, a help-line, or a ticket sales service, to name a few.

The communication system 100 may filter calls, as described above, via an Ingress Call Filter efficiency feature 128. The Ingress Call Filter 128 may implement, at least partially, the methods described herein. Generally, the Ingress Call Filter 128 may mitigate penalties assessed to the inter-carrier network exchange 102 for incomplete or failed calls. Further, the communication system 100 may implement various other features that enable efficiencies, such as a Call Extender efficiency feature 125 that may mitigate surcharges that are assessed to the inter-carrier network exchange 102 by any of the vendor exchanges 118a-118b for terminating short-duration calls. The communication system 100 may also implement an Auto-Dialer Detector efficiency feature 130 that may detect and block calling parties 105 that are auto-dialers, e.g., electronic devices or software that automatically dial telephone numbers. Still further, the communication system 100 may implement a Vendor Evaluator efficiency feature 132 that may prevent the use of poorly performing vendor exchanges 118a-118n to service calls, and may decrease the number of trouble tickets raised against the inter-carrier network exchange 102. Each of these features 125-132 may individually and/or collectively increase the efficiency of the inter-carrier network exchange 102 and/or of the communication system 100. Some examples of the features 125, 130, and 132 are described in further detail in copending U.S. application Ser. Nos. 14/633,226, 14/543,486, and 14/504,757, respectively, each of which are hereby incorporated by reference.

The efficiency features 125-132 may be implemented by the inter-carrier network exchange 102, at least partially, to reduce processor cycles of computing devices that process inbound calls, in some implementations. The processor cycles may be reduced on processor(s) of the call router 112 or any other component of the communication system 100. Additionally, the efficiency features 125-132 may, in some cases, reduce costly transfers of data between network components (e.g., between the inter-carrier network exchange 102 and one of the vendor exchanges 118a-n). The reduction of processor cycles and data transfers may lessen the overall computational load on a communication system, resulting in a reduced operating costs, increased reliability, higher call completion rates, reduced downtime, etc.

At least some of the efficiency features 125-132, such as the Ingress Call Filter 128, may operate in conjunction with or based on data stored in a database of historical call data records (CDRs) 135 of the inter-carrier network switch 135. The CDR database 135 may be included in the inter-carrier network exchange 102 as illustrated in FIG. 1, or the CDR database may be communicatively connected to the inter-carrier network exchange 102.

Additionally, each of the efficiency features 125-132 is shown as being included as part of the inter-carrier network exchange 102, however, this is only one of many possible embodiments. For example, rather than being included in the inter-carrier network exchange 102, the Ingress Call Filter 128 may be disposed in the system 100 between the inter-carrier network exchange 102 and the long distance provider 115 or between the inter-carrier network exchange 102 and any number of the vendors 118a-n. At any rate, each of the efficiency features 125-132 may operate in conjunction with the inter-carrier network exchange 102, whether the features 125-132 are included in the inter-carrier network exchange 102 or are communicatively connected to the inter-carrier network exchange 102.

Further, the system 100 may include any number of the efficiency features 125-132. For example, a system 100 may include one, two, three, etc. instances of the Ingress Call Filter 128 along with any number of each of the features 125, 130, and 132. Additionally, any number of instances of the Ingress Call Filter 128 and/or any number of the features 125, 130, and 132 (e.g., one, two, three or four of the features 125-132) may be invoked during a particular call (e.g., during the set-up and/or tear down of the call 108). Still further, a provider or operator of the communications system 100 (and/or of the inter-carrier network exchange 102) may be able to independently activate and de-activate each of the features 125-132.

Figure 2:
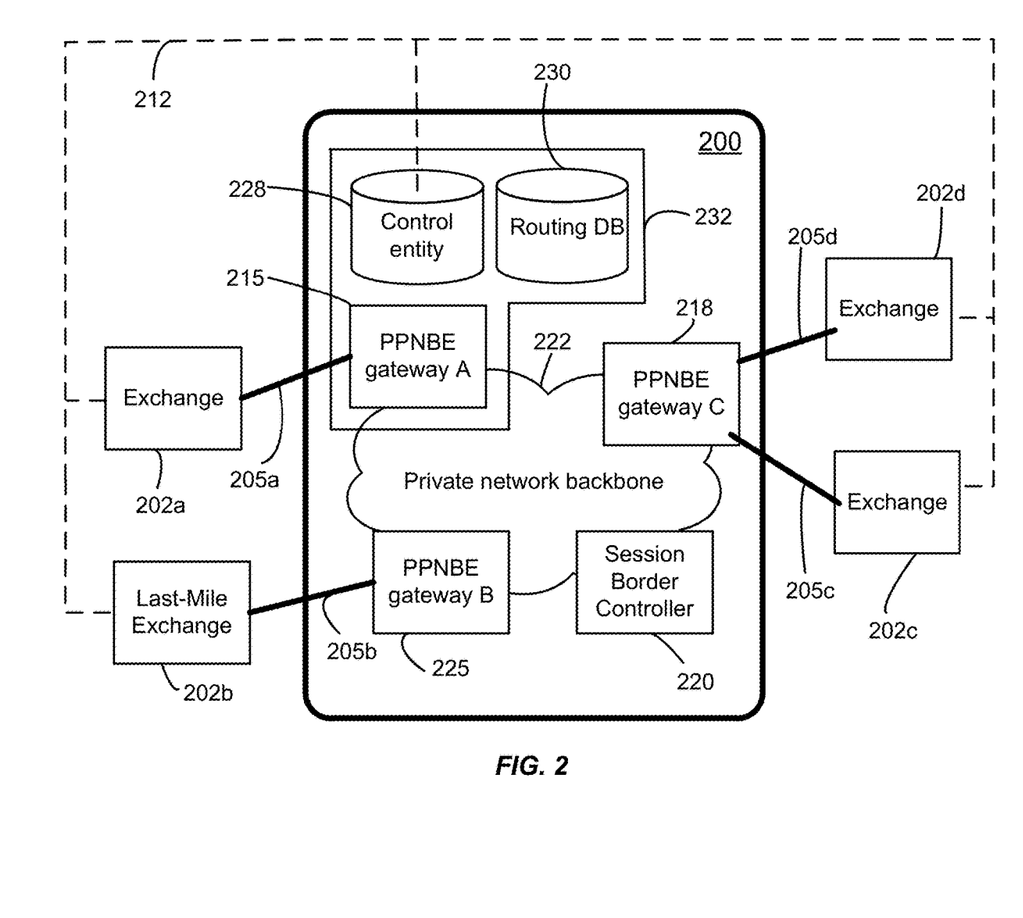
FIG. 2 illustrates an example of a private packet network backbone exchange in which inbound calls can be filtered, which private packet network backbone exchange can operate as part of or in conjunction with the communication system illustrated in FIG. 1.

As previously mentioned, in some embodiments, the inter-carrier network exchange 102 of FIG. 1 may comprise a private packet network backbone exchange (PPBNE), such as the PPNBE described in aforementioned U.S. patent application Ser. No. 12/469,454 (now issued as U.S. Pat. No. 8,284,765), or the inter-carrier network exchange 102 may comprise another PPNBE. FIG. 2 illustrates an example of a private packet network backbone exchange (PPNBE) 200 that may be included in the inter-carrier network exchange 102 of FIG. 1 or another suitable inter-carrier network switch. In fact, embodiments of the PPNBE 200 of FIG. 2 may be used in conjunction with embodiments of the system 100 of FIG. 1.

Referring now to FIG. 2, the PPNBE 200 may be connected to one or more networks, switches, or exchanges 202a, 202b, 202c, 202d, at least some of which may be provided by the different carriers, vendors, or service providers. For example, the exchange 202a may be the long distance termination provider exchange 115 of FIG. 1, and each of the exchanges 202b, 202c, 202d may be a different vendor exchange 118a, 118b, 118n of FIG. 1. One or more respective trunk groups 205a-205d may respectively connect each exchange 202a-202d to the PPNBE 200.

The PPNBE 200 and each of the other exchanges 202a-202d may be in signaling communication with a signaling network 212, which is depicted in FIG. 2 by the dashed lines. The signaling network 212 may be an out-of band network, an in-band network, or some combination of the two. In some embodiments, the signaling network 212 may be an SS7 (Signaling System No. 7) network. Other signaling protocol networks 212 may be additionally or alternatively utilized, e.g., SIP (Session Initiation Protocol), SIGTRAN, etc. In some embodiments, different types of signaling may be used for different exchanges 202a-202d. A logical call control entity 228 or other suitable component of the PPNBE 200 may establish calls between the different exchanges 202a-202d using the signaling network 212, out-of-band technologies, and/or in-band signaling technologies known in the art, such as SS7, TDM (Time Division Multiplex), SIP, or VoIP (Voice over Internet Protocol) technologies.

Call traffic may enter the private packet network backbone exchange 200 from a particular exchange 202a-202d via an originating PPNBE gateway (215, 218, 220, 225). As used herein, the term "PPNBE gateway" is not limited to mean a gateway of any particular technology, but may include gateways 215, 218, 220, 225 that may support any type of communication technology, for example, a TDM-supporting gateway 215, a VoIP-supporting gateway 220 such as a session border controller, or some other technology-supporting gateway 218. Call traffic may then traverse a private network backbone 222 to a terminating PPNBE gateway 215, 218, 220, 225 to be delivered to a respective downstream exchange. For some calls, the originating gateway 215, 218, 220, 225 and the terminating gateway 215, 218, 220, 225 may be the same entity.

In some embodiments, the private network backbone 222 may include a set of privately managed nodes (not shown) to route packet call traffic. Each PPNBE gateway (215, 218, 220, 225) may convert incoming call traffic from the protocol or format used by the corresponding exchange 202a-202d into a packet format used by the set of privately managed nodes in the private network backbone 222. In some embodiments, the set of privately managed nodes may communicate using a packet format corresponding to an Internet Protocol format (IP). In some embodiments, the private network backbone 222 may use other types of technologies other than IP to deliver call traffic within the private network backbone 222, such as ATM or other packet/cell switching technologies.

Privately managed nodes may route packets or cells across the privately managed nodes in the private network backbone 222 to the terminating PPNBE gateway 215, 218, 220, 225, where the packets or cells may be converted into a format understood by the corresponding receiving exchange 202a-202d. As the private network backbone 222 is not the public Internet and is privately managed, operators of the network 222 may engineer or control the number of nodes and routing of packets within the network 222 to maximize call quality and minimize delay.

In the PPNBE 200, the control entity 228 may perform call control. The control entity 228 may include one or more servers or cloud computing devices, or other computing devices having a memory and having the ability to interface with the signaling network 212. Control entity 228 may provide call control as well as feature, service and other types of control needed for communication service. In an embodiment, the logical call control entity 228 includes the call router 122 of FIG. 1, or the call router 122 of FIG. 1 includes the logical call control entity 228. Control entity 228 may be represented to the PSTN and other networks as a single logical control entity (e.g., by being identified by a single address), or may be identified via information in a single logical routing database 230. Control entity 228 may or may not be physically co-located with the logical routing database 230, but information in the logical routing database 230 may be accessible for use by the control entity 228 in establishing calls.

FIG. 2 illustrates the control entity 228, the routing database 230 and PPNBE gateway A 215 as being physically co-located 232. Physically co-locating the control entity 228 and/or the single logical routing database 230 with other equipment such as PPNBE gateway A 215 may be beneficial for optimizing ease of maintenance and configuration of the PPNBE 200, but is not necessary. The control entity 228 and/or the single logical routing database 230 may be located anywhere and are not required to be physically co-located with any PPNBE gateway 215, 218, 220, 225, with each other, or with any other equipment that is a part of the private packet network backbone exchange 200.

Control entity 228 may be scalable. As the volume of aggregate traffic through the PPNBE 200 increases, the number of physical computing devices on which the control entity 228 resides may be increased, however, the control entity 228 may still appear as a single entity having a single address, and/or may be accessed by the signaling network 212 via the information in the single logical routing database 230. If more than one physical computing device is necessary to support the control entity 228, the more than one physical computing device may be located locally, remotely or some combination of locally and remotely.

Likewise, in some embodiments, the single, logical routing database 230 of the PPNBE 200 may be scalable. The logical routing database 230 of the PPNBE 200 may be physically located across more than one local and/or remote computer-readable storage media entities; however, the logical routing database 230 may logically appear as a single logical routing database 230.

PPNBE gateways 215, 218, 220, 225 may also be scalable. As the number of available physical connections to the PPNBE 200 desired by local exchanges in a geographical area increases, a capacity of an individual PPNBE gateway may be increased. Also, if desired, an operator of the PPNBE 200 may add additional PPNBE gateways to the PPNBE 200 to provide additional trunk connections (e.g., additional communication paths) to the exchanges 202a-202d. The control entity 228 may continue to manage the additional gateways, however, for servicing calls and providing features and communication services. The PPNBE 200 may maintain the same single address for control entity 228 independent of the total number and size of available PPNBE gateways 215, 218, 220, 225.

The number of nodes within the private network backbone 222 may be scalable to support a desired communication traffic volume. Similar to other elements of the PPNBE 200, the nodes within the private network backbone 222 are not required to be physically co-located, but each node merely must be in communicative connection with at least one other node in the private network backbone 222.

As the PPNBE 200 includes a private network backbone 222, this and other above discussed features of the PPNBE 200 allow the PPNBE 200 to handle a logical call capacity far greater than any conventional inter-carrier network exchange known in the art. In fact, the PPNBE 200 may be easily scaled to gracefully handle call traffic from multiple exchanges 202a-202d even during surge situations.

In some embodiments, the PPNBE 200 includes the historical call data records (CDR) database 135 of FIG. 1 (not depicted in FIG. 2). For example, the historical CDR database 135 may be a node that is communicatively connected to the private packet backbone network 222, and at which call data records generated by calls that traverse (and/or that attempt to traverse) the inter-carrier exchange 102 may be stored. Similar to the logical routing database 222, the historical CDR database 135 of the inter-carrier exchange 102 may be scalable. For example, the CDR database 135 may be physically located across more than one local and/or remote computer-readable storage media entities; however, the CDR database 135 may logically appear as a single historical CDR database 135.

The private packet network backbone exchange 200 may include different types of commercial equipment. For example, in the PPNBE 200, voice equipment may include a policy server, an SS7 signaling gateway, a CDR collector, a billing mediation server, an element management system, a media gateway, a signaling transfer point (STP), a voice monitoring system, etc. IP and transport equipment of the PPNBE may include a Digital Cellular Service (DCS), an IP router, an Ethernet switch, etc.

Figure 3:
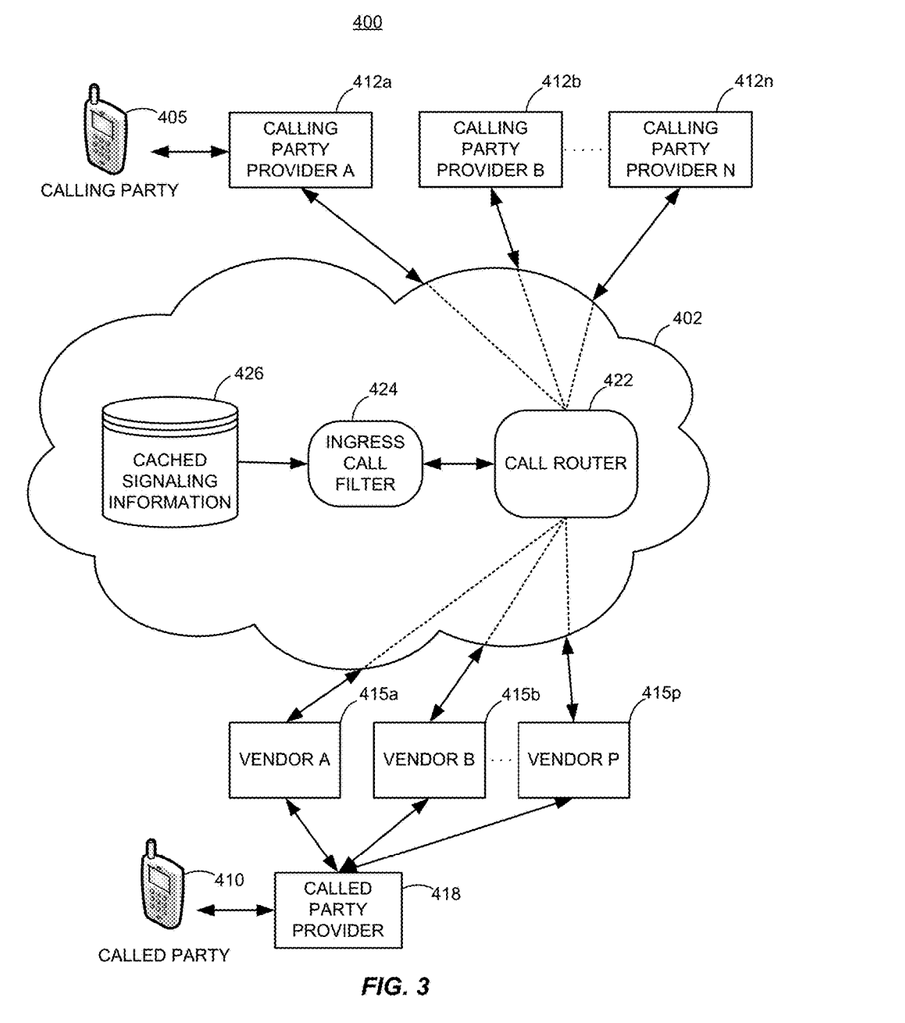
FIG. 3 depicts an another embodiment of a communication system that supports an ingress call filter feature.

FIG. 3 depicts another embodiment of a communication system 400 that supports inter-carrier switching and which implements an ingress call filtering efficiency feature. The communication system 400 may include components substantially similar to that of the example system 100. In particular, the system 400 may include an inter-carrier switch 402. In an embodiment, the inter-carrier switch 402 is the inter-carrier network exchange 102 as described with respect to FIG. 1. A calling party 405 may originate a voice or data call that is destined for a called party 410. The originating call may be initially serviced by one or more calling party providers 412a-412n of the calling party 405. For ease of discussion, FIG. 3 does not illustrate certain components substantially similar to components of systems 100, such as a long distance termination provider. However, it should be understood that the example system 400 may implement any of the components of the system 100.

In this and other embodiments, the inter-carrier switch 402 may be connected to one or more exchanges 415a-415p. At least some of the exchanges 415a-415p may correspond to vendors that assess surcharges when attempted calls or data connections to the called party 410 cannot be completed. For example, the vendor corresponding to the exchanges 415a may assess a surcharge for a number or a percentage of calls to invalid phone numbers, numbers not in service, unallocated phone numbers, etc. However, generally the vendors operating the exchanges 415a-415p may assess surcharges for any failed calls or data connections returning any cause codes other than those indicating invalid phone numbers, numbers not in service, or unallocated phone numbers.

A call router 422 of the inter-carrier switch 402 may receive the originating call from one of the calling party providers 412a-412n, select one of the vendors or carrier exchanges 415a-415p, and attempt to connect the call to the selected vendor network 415a-415p (e.g., via selected dashed lines in FIG. 4A). The selected vendor 415a-415p may attempt to connect the call to a called party provider 418 of the called party 410.

The inter-carrier switch 402 may include an ingress call filter 424 feature or application to mitigate the surcharges assessed by the vendors corresponding to the exchanges 415a-415p. For example, the ingress call filter 424 may be the ingress call filter 128 of FIG. 1. As discussed further with reference to FIGS. 5-7, the ingress call filter 424 may filter attempted calls or data connections (e.g., SIP INVITE requests) from the calling party providers 412a-412n based on signaling information indicating which of those attempted call or data connections is likely to fail. In the example communication system 400, a data storage device 426 (e.g., the CDR database 135) may communicate or transmit cached signaling information to the ingress call filter 424 such that the ingress call filter 424 may predict, based on the transmitted cached signaling information, and filter attempted calls that are likely to fail. For example, the transmitted cached signaling information may indicate previously failed calls and corresponding cause codes that have been routed through the call router 422 within a recent time period (e.g., a most recent week, day, hour, etc.). In some cases, operators of the inter-carrier network 402 may activate (e.g., turn on and off) the ingress call filter 424 for each of the providers 412a-412n and may only filter attempted calls or data connections from some of the providers 412a-412n.

Figure 4:
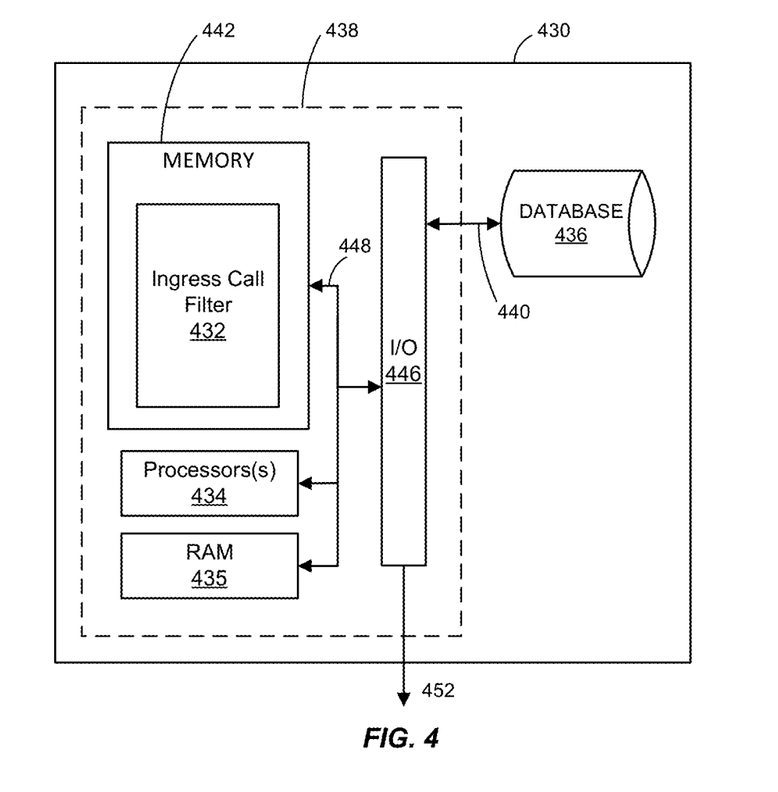
FIG. 4 is a block diagram of an example computing device implementing an ingress call filter feature, such as the ingress call filter feature depicted in FIG. 3.

The ingress call filter 424 may include one or more specialized modules, routines, engines, etc. that specifically configure a computing device, such as a network server. FIG. 4 illustrates an example computing device 430 that may by specially, or specifically, configured by an ingress call filter 432. The ingress call filter 432 may be implemented as the ingress call filter 424 in the inter-carrier network 402, for example.

The computing device 430 includes one or more computer processors 434 specially adapted and configured to execute various modules, engines, applications and components of the system 400, in addition to other applications. The computing device 430 further includes a database 436. The database 436 is adapted to store data related to the operation of the system 400 or the operation of one or more ingress call filters. Such data might include, for example, cached signaling information received via a feed from the data storage device 426 and/or analytics data allowing users to track the performance of the ingress call filter 432. The computing device 430 may access data stored in the database 436 when executing various functions and tasks associated with the operation of the system 400.

Although illustrated as the computing device 430, the specialized functionality implemented by the computing device 430 may be distributed among a plurality of servers, in an implementation. This configuration may provide several advantages, such as, for example, enabling near real-time uploads and downloads of information as well as periodic uploads and downloads of information.

The computing device 430 may have a controller 438 that is operatively connected to the database 436 via a link 440. It should be noted that, while not shown, additional databases may be linked to the controller 438 in a known manner. The controller 438 may include a non-transitory program memory 442, the one or more processors 434 (may be called a microcontroller or a microprocessor), a random-access memory (RAM) 435, and an input/output (I/O) circuit 446, all of which may be interconnected via an address/data bus 448. The program memory 442 may be configured to store computer-readable instructions that specially configure the computing device 430 such that, when executed by the processors 434, the computer-readable instructions cause the computing device 430 to implement the ingress call filter 432 feature or application.

In particular, the instructions for the ingress call filter 432 may cause the computing device 430 to, at least partially, implement the methods described with reference to FIGS. 5-7. While shown as a single block in FIG. 4, it will be appreciated that the ingress call filter 432 may include a number of different programs, modules, routines, and subroutines that may collectively cause the computing device 430 to implement the ingress call filter 432. Further, while the instructions for the ingress call filter 432 are shown being stored in the program memory 442, the instructions may additionally or alternatively be stored in the database 436 and/or RAM 435. Although the I/O circuit 446 is shown as a single block, it should be appreciated that the I/O circuit 446 may include a number of different types of I/O circuits. The RAM 435 and program memories 442 may be a non-transitory memory implemented as semiconductor memories, magnetically readable memories, and/or optically readable memories, for example. The controller 438 may also be operatively connected to other components of an inter-carrier exchange, such as the inter-carrier exchange 402, via a link 452 and one or more wired or wireless network interfaces (not shown).

In some implementations, this ingress call filter 432 may: (i) receive a feed of cached signaling information from a data storage device, such as the data storage device 426 or the CDR database 135; (ii) receive queries from a call router, such as the call router 422, identifying a called party corresponding to an attempted call (e.g., by a phone number); (iii) determine, based on the received cached signaling information, if the attempted call to the called party will likely fail; and (iv) if it is likely that the attempted call will fail, filter the attempted call by generating an indication that communicates to the call router 422 that the attempted call should be filtered or rejected. In addition, the ingress call filter 432, the data storage device 426, the call router 422, and/or other components of the inter-carrier network 402 may generate and transmit proprietary or otherwise unique cause codes indicating the filtering of calls by the ingress call filter 424.

Figure 5:
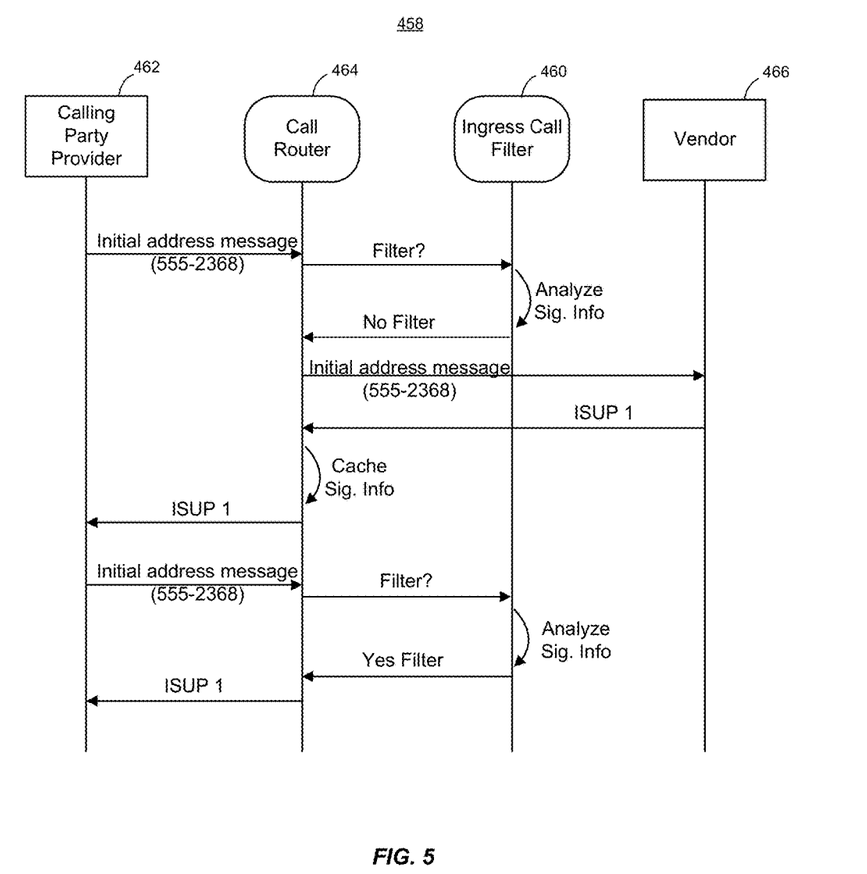
FIG. 5 is an example call flow in which a call is filtered by an ingress call filter, such as the ingress call filter feature depicted in FIG. 3.

FIG. 5 illustrates an example call flow 458 in which an ingress call filter 460 filters incoming calls from a calling party provider 462. The functionalities described with reference to the call flow 458 may be implemented by one of the systems 100 or 400, for example. Although the Signalling System 7 (SS7) is emphasized with reference to FIG. 5, it is understood that an ingress call filter may filter calls established via any suitable signaling communications protocol.

The calling party provider 462 may communicate an Initial Address Message (IAM) message (e.g., via the SS7 protocol) to a call router 464, to establish a call between a calling party and a specific called party (not shown). In an implementation, the IAM message may identify a phone number of the specific called party via one or more digits (e.g., 555-2368) or via any other suitable symbols, alphanumeric characters, etc. The call router 464 may then query an ingress call filter 460 to determine if the call to the specific called party (e.g., 555-2368) should be filtered, as indicated in FIG. 5 by the label "Filter?".

The ingress call filter 460 may then analyze cached signaling information (e.g., received from the data storage device 426) to determine if the attempted call is to be filtered. Such a determination may be based on whether any attempted calls, or a certain number or percentage of attempted calls, to the called party have failed within a most recent time period for which cached signaling information has been received. In some implementations, the ingress call filter may utilize a threshold number of calls that can fail or a threshold call failure percentage in the determination. When the number of calls or call failure percentage exceeds the respective threshold, the ingress call filter 460 may determine that the call is to be filtered. Conversely, when the number of calls or call failure percentage does not exceed the threshold, the ingress call filter 460 may determine that the call will not be filtered. Cached signaling information received from the data storage device 426 may indicate recent failed calls, such as calls to unallocated numbers, via one or more cause codes (e.g., ISUP cause codes, SIP release codes, or other signaling cause codes).

In an implementation, the ingress call filter 460 may receive a "feed" of currently cached signaling information from the data storage device 426 at periodic or otherwise determined times. For example, the ingress call filter 460 may receive an updated batch of cached signaling information every ten seconds, one minute, hour, etc. In certain implementations, the feed of cached signaling information sent to the ingress call filter 460 may include near real-time updates of the cached signaling information. In other implementations, the ingress call filter 460 may receive an updated batch of cached signaling information in response to a trigger event. For example, the cached signaling information may be sent to the ingress call filter 460 in response to a received (e.g., by the call router 464) request to complete a call.

In the scenario illustrated in FIG. 5, the ingress call filter 460 may determine that the cached signaling information indicates that no attempted calls to the specific number 555-2368 have failed within a most recent time period. As such, the ingress call filter 460 may indicate to the call router that the attempted call should not be filtered (i.e., that the call should be completed), as illustrated in FIG. 5 by the label "No Filter."

Subsequently, the call router 464 may attempt to complete the requested call from the calling party via an exchange 466 operated by a certain vendor. Upon attempting to complete the call, the exchange 466 may return a cause code to the call router 464 indicating that the requested call to 555-2368, in the illustrated scenario, could not be completed. By way of example, the exchange 466 may return cause codes indicating an unallocated number (ISUP 1, as illustrated in FIG. 5), user busy (ISUP 17), no user responding (ISUP 18), call rejected (ISUP 21), destination out of order (ISUP 27), and/or any other ISUP cause code. In embodiments that communicate via SIP protocol, the exchange 466 may return cause codes indicating that the destination could not be found (SIP 404), access to the destination was forbidden (SIP 403), the destination is busy (SIP 486), and/or any other SIP release code.

The call router 464, the ingress call filter 460, or any other suitable computing device or component of an inter-carrier network in which the call router 464 is disposed may then cache the received signaling information from the exchange 466. The call router 464 or other component of an inter-carrier network, such as the inter-carrier switch 402, may cache a data entry indicating the cause code (e.g., ISUP 1 or other cause code) corresponding to the specific called party (e.g., 555-2368) in a data storage device, such as the data storage device 426 or the CDR database 135. In addition to the cause code, other indications may be cached, for example, the identity of the calling party provider, the identity of the specific called party, a time that the failure occurred, an ID number corresponding to the failed call event, and other indications describing the failed call event.

The call router 464 and/or other components of the inter-carrier switch 402 may, in some implementations, prioritize cause codes stored in the cached signaling information. For example, the call router 464 may receive multiple different cause codes corresponding to a specific called party, and the call router 464 may, based on a user-defined (e.g., programmed) priority table, only cache one or a certain number of the multiple different cause codes. For example, the call router 464 may be configured to prioritize an "unallocated number" cause code over an "a user busy" cause code when storing signaling information.

Further, in some implementations, each cached data entry (e.g., data stored in the data storage device 426 or the CDR database 135) may have a corresponding time-to-live value. The time-to-live value represents a length of time that the corresponding data entry will be stored in the cache before it is deleted or otherwise removed. For example, for a particular data entry, the time-to-live value may indicate that the particular data entry should "live," or be stored or cached, for five minutes. Once the five minutes elapse, the call router 464 or other suitable component the inter-carrier switch 402 may delete the data entry from the cache.

Some signaling information returned in call failures scenarios may indicate a higher likelihood of future call failure than other signaling information returned in other call failure scenarios. Accordingly, when the call router 464 or other suitable inter-carrier network component caches the data entry corresponding to a call failure, the call router 464 may assign a time-to-live value that is different than time-to-live values corresponding to other call failures. The operator of the inter-carrier switch 402 may pre-determine a time-to-live value or the call router 464 may dynamically determine a time-to-live value in near real time. For example, the call router 464 may utilize pre-determined time-to-live values stored in a look-up table or matrix, wherein the table or matrix may indicate time-to-live values for specific calling party providers, for specific cause codes, or both. When determining the time-to-live value, the call router 464 may query the look-up table or matrix and assign the corresponding time-to-live value. In other examples, the call router may dynamically assign variable time-to-live values, as discussed further below.

Referring again to FIG. 5, the call router 464 may receive another request for a call to the same called party (e.g., 555-2368) within the time-to-live of the cached call failure event corresponding to the first call. The ingress call filter 460 may then analyze the cached signaling information and identify the previously cached data entry corresponding to the first call to the called party. In this scenario, the ingress call filter 460 may indicate to the call router 464 that the new call to the same called party should be filtered (e.g., rejected) due to a likelihood that the call will fail, as illustrated in FIG. 5 by the label "Yes Filter." The call router 464 may then, instead of attempting to complete the requested call via the exchange 466, return a cause code indicative of a rejected or failed call to the calling party provider 462. The cause code returned to the calling party provider 464 upon filtering the call may be the same or different than the cause code originally returned by the exchange 466 and cached in the data storage device 426.

In some cases, the ingress call filter 460 may generate proprietary or otherwise unique cause codes, for storage in the data storage device 426. The proprietary or otherwise unique cause codes may be indicative of calls being filtered by the ingress call filter 460, and may differ from standard ISUP cause codes or other cause/release codes generally used in signaling communications protocols. For example, the ISUP protocol does not define cause codes 112-126. If the ingress call filter 460 is specifically programmed to generate an ISUP cause code 112 when a call is likely to fail, compliance with the ISUP protocol is maintained while still allowing the ingress call filter 460 to indicate certain instances when a call is filtered by the ingress call filter 460. By storing these unique cause codes, operators of the inter-carrier switch 402 implementing the ingress call filter 460 may query the stored unique cause codes to audit the ingress call filtering functionality of the inter-carrier switch 402. In one scenario, a customer of the inter-carrier switch 402 may contact the operators expressing concern over a number of calls rejected by the call router 464. Subsequently, the operators may query the unique cause codes returned by the ingress call filter 460 to determine that many of the calls originated by the customer were to unallocated numbers, busy numbers, etc. and were filtered by the ingress call filter 460. It should be appreciated that while a proprietary cause code may be communicated by the ingress call filter 460, the call router 464 may not return the proprietary cause code to the calling party provider 462, at least in some implementations.

In some embodiments, when the ingress call filter 460 filters a call, the filtering event may not influence future determinations of the ingress call filter 460 in relation to filtering future calls. For example, when the ingress call filter 460 filters a call, a terminating exchange does return signaling information to the call router 464 (e.g., indicating failure of the call) because the call is not attempted with the terminating exchange. Thus, in these cases, the call router 464 does not receive any signaling information to store in the data storage device 426 and the filtered call does not influence future filtering by the ingress call filter 460. That being said, some implementations of the call router 464 or ingress call filter 460 may include functionality that allows some information about a filtering event to be stored for purposes other than filtering future calls (e.g., auditing).

As previously discussed, the call router 464 may determine a time-to-live value based on characteristics of the call failure, such as those characteristics indicated, for example, in cause/release codes received by the call router 464. Alternatively or additionally, the call router 464 or other suitable component may determine such differences or variances of time-to-live values based on the identity of the calling party provider 462. By varying the time-to-live value, an operator of the inter-carrier switch 402, may customize or adjust the filtering of calls for each of a plurality of calling party providers and/or for each of a plurality of cause codes.

In some cases, the call router 464 may more consistently and adjustably identify calls that are likely to fail by utilizing varying time-to-live values, as compared to utilizing a single time-to-live or even persistently stored signaling information. However, envisioned systems and methods that utilize a single time-to-live may have other advantages. For example, using only a single time-to-live value may reduce complexity, enabling the call router 464 to cache signaling information indicating call failures more efficiently (e.g., in fewer clock cycles).

In some implementations in which time-to-live values are adjusted dynamically, the call router 464 may store a default time-to-live value (e.g., 5 seconds) that is modified by one or more scaling factors upon the caching of signaling information. For example, the call router 464 may multiply a default time-to-live value by one or more scaling factors to produce varying time-to-live values upon caching signaling information. These scaling factors may include, by way of example, factors (e.g., numerical factors) corresponding to individual characteristics of a call failure event, such as, for example, a cause code and/or an identification of a calling party provider. In some implementations, a cause code priority table, such as the aforementioned priority table, or any other suitable list or data structure, may include a pairing of numerical time-to-live scaling factors (e.g., used to scale a default time-to-live) with each of a plurality of cause codes.

Such scaling factors may be pre-determined, or otherwise determined, based on a correlation of the respective cause code and a future call failure. In some cases, operators of the call router 464 may pre-determine and configure the call router 464 (e.g., program the call router 464) to define certain scaling factors. In other cases, the scaling factors may be dynamically determined and/or modified based on up-to-date statistics measuring the correlation between cause codes and future call failures. For example, a specially configured adaptive routine or engine implemented by the call router 464 (e.g., including one or more learning algorithms such as regression, neural network, etc.) may be trained and/or updated based on gathered CDRs, wherein the CDRs indicate numbers of calls that failed after previously attempted calls returned certain cause codes.

As an example, an ISUP cause code for "user busy" (ISUP 17) may have a low correlation of future call failures as compared to an ISUP cause code for "destination out of order" (ISUP 27). In this example, a scaling factor applied to the default time-to-live value for the "user busy" cause code will be less than a scaling factor corresponding to the "destination out of order" cause code. Further, for some cause/release codes, the scaling factor may be 0, such that certain signaling information is not cached (e.g., has a time-to-live of 0 seconds).

Similarly, a scaling factor may correspond to properties associated with a particular calling party provider. Certain ones of the calling party providers 412a-412n may more frequently request calls that fail as compared to other ones of the calling party providers 412a-412n. A count, average, or other measure of the number of failed call attempts initiated by a particular calling party provider may represent or, at least be correlated with, a likelihood that a future call initiated by the particular calling party provider will fail. Accordingly, a scaling factor may correspond to such counts, averages, or other measures of the number of previously attempted, but failed, calls corresponding to a particular calling party provider.

In one example, when a certain calling party provider initiates, on average, two failed calls per hour, a scaling factor corresponding to that calling party provider factor may be 1.4. That is, when future calls from that calling party provider fail, corresponding signaling information will be cached for a time equivalent to the default time-to-live multiplied by the scaling factor of 1.4. Likewise, when a calling party provider initiates, on average, ten failed calls per hour, the corresponding scaling factor may be 2, and, when a calling party provider initiates, on average, fifty failed calls per hour, the corresponding scaling factor may be 3.

Generally, any suitable scaling factors and/or time-to-live values may be implemented based on the identify of calling party providers with or without a basis on an average, or other measure, of the number of failed calls that the calling party provider initiates. For example, when the default time-to-live value is 5 seconds, a scaling factor corresponding to a particular cause code is 1.2, and a scaling factor corresponding to a particular calling party provider factor is 1.4, the call router 464 may determine the cached time-to-live value as 8.4 seconds (5 seconds*1.2*1.4). Alternatively, the call router 464 may query a table or matrix to determine the particular time-to-live value of 840 ms corresponding to the particular called party and the particular cause code. Further, it should be appreciated that call routers, such as the call router 464, may utilize any number of other scaling or caching methods, such as methods involving averages, weighted averages, etc., to adjust time-to-live values based on cause codes and/or identifications of calling party providers.

Figure 6:
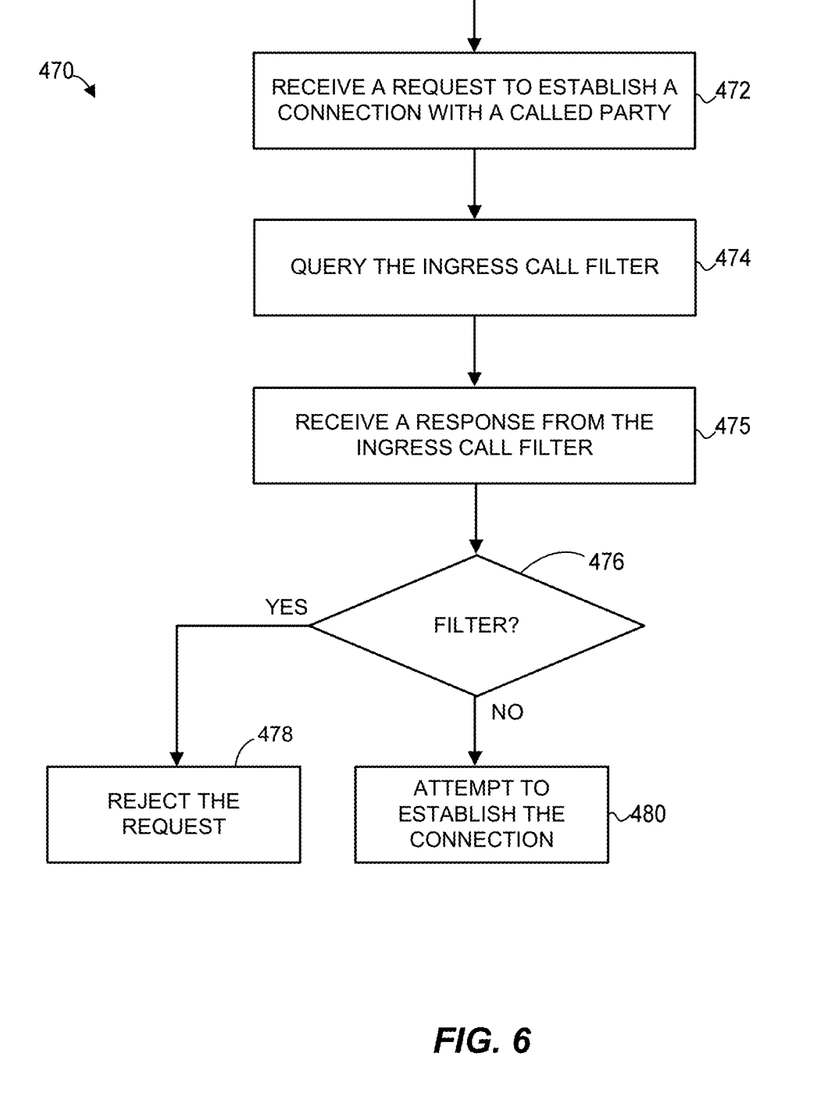
FIG. 6 is a flow diagram of an example method for filtering requested connections which can be implemented in the system depicted in FIG. 3.

FIG. 6 is a flow diagram of an example method 470 for filtering calls, based on cached signaling information, so as to reduce surcharges assessed by vendors and to more efficiently use resources of the inter-carrier switch 402. The method 470 may be implemented by one of the call routers 422 or 464, for example.

The call router 464 may receive a request (e.g., from a calling party provider) to establish a connection, such as a voice or data call, with a called party (block 472). The calling party provider 462 may, for example, send an INVITE message to the call router 464 identifying a called party by a phone number. Subsequently, the call router 464 may query the ingress call filter 460 to determine if the requested call should be filtered (block 474). In some cases, the call router 464 may forward the request (e.g., INVITE) from the calling party provider 462 directly to the ingress call filter 460, and, in other cases, the call router 464 may generate and send a query message different from the request from the calling party provider 462.

The call router 464 may then receive a response from the ingress call filter 460 (block 475). The call router 464 may determine if, based on the response, the requested connection should be established or filtered (e.g., rejected) (block 476). If the response from the ingress call filter 460 indicates that the requested connection should be filtered, the flow may continue to block 478 where the call router 464 may return a cause code to the requesting party indicating that the requested connection is rejected or failed. If the response from the ingress call filter 460 indicates that the requested connection should be established, the flow may continue to establish the connection (block 480) where the call router 464 may attempt to complete the requested connection via a selected exchange.

In some implementations, each calling party provider 412a-412n may correspond to an identification of the calling party provider that is used to determine whether calls received from the calling party provider 412a-412n should be sent to the ingress call filter 460. To this end, the operator of the inter-carrier switch 402 may establish a "white list." The "white list" may be a list of calling party providers whose calls will not be filtered by the ingress call filter 464, regardless of the likelihood the call might fail. In some scenarios, the operator of the inter-network carrier switch 402 may offer various tiers of service to calling party providers, where some but not all of the tiers of service include a filtering of calls. In these scenarios some calling party providers may pay the operator of inter-network carrier switch 402 to ensure that their calls are not filtered. When such an arrangement exists with the calling party providers, the operator of the inter-carrier switch 402 may add the paying calling party providers to the "white list."

In these implementations, after the call router 464 receives the request to establish a connection (block 472), the call router 464 may compare the identification of the calling party provider to the "white list" determine if the ingress call filter 460 should be queried. When the identification of the calling party provider is contained in the "white list," the call router 464 may proceed straight from block 472 to block 480 where the connection is attempted, without querying the ingress call filter 460 (block 474). Conversely, if the identification of the calling party provider is not contained within the "white list," the call router 464 may perform the actions corresponding to method 470 as described above. It should be appreciated that the operator of the inter-carrier switch 402 may implement any number of "white lists" describing different business relationships.

Figure 7:
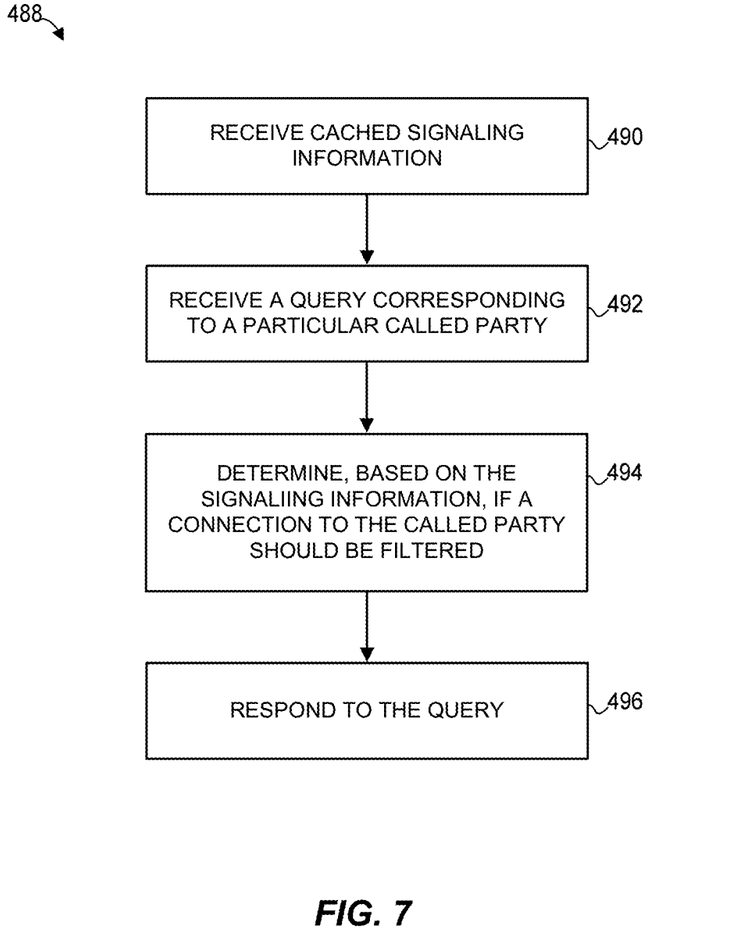
FIG. 7 is a flow diagram of an example method for determining connections that should be filtered which can be implemented in the system depicted in FIG. 3.

FIG. 7 is a flow diagram of an example method 488 for determining if an attempted call should be filtered based on cached signaling information. Although the method is described with respect to ingress call filter 424, some or all of the ingress call filters 424, 432, and 460 may implement the method 488, for example.

To begin, the ingress call filter 424 may receive cached signaling information (block 490). As discussed above, the ingress call filter 424 may receive a feed of cached signaling information from the data storage device 426, where the feed includes a batch of newly updated cached signaling information every five minutes, half hour, hour, or at any other suitable times. In some implementations, the ingress call filter 424 additionally or alternatively receives the feed in response to a trigger event, such as receiving a request to establish a call. The received cached signaling information may indicate a plurality of attempted calls from one or more calling party providers, such as the calling party providers 412a-412n, that were rejected or returned by one or more exchanges, such as the exchanges 415a-415p. In particular, the received cached signaling information may indicate cause codes, phone numbers, IP addresses, calling party provider identifications, times-to live, etc. corresponding to the failed call events.

The ingress call filter 424 may also receive a query (e.g., from a call router) indicating a specific called party for which a new connection is requested (block 492). For example, the call router 422 may send a query to the ingress call filter 424 based on a request from the calling party provider 412a to establish a connection with the called party. The query may include the request from the calling party provider 412a identifying the called party (e.g., by a phone number) and/or other information generated by the call router 422 identifying the called party. In any event, the received query indicates that the ingress call filter 424 should determine whether the request connection should be filtered.

The ingress call filter then determines, based on cached signaling information, if the requested connection to the called party should be established or filtered (block 494), as further discussed with reference to FIG. 5. Based on this determination, a response to the query is generated and sent to the call router 422 (block 496). In this manner, the call router 422 may selectively filter or establish requested connections, as further discussed with reference to FIG. 6.

Although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims. Accordingly, it should be understood that the methods and apparatus described herein are illustrative only and are not limiting upon the scope of the claims.

Thus, many modifications and variations may be made in the techniques and structures described and illustrated herein without departing from the spirit and scope of the present claims.

What is claimed:

1. A method comprising:
receiving, from a first provider corresponding to a first calling party and at a private packet network backbone exchange connected to a plurality of vendor networks, a request to establish a connection with a called party;
based on the request from the first provider, generating, by a call router, a query to be transmitted from the call router to an ingress call filter, wherein the query indicates the called party;
in response to submitting the query to the ingress call filter, receiving, from the ingress call filter, an indication that the connection with the called party is to be filtered;
based on the indication that the connection with the called party is to be filtered and without routing the request to a vendor network of the plurality of vendor networks associated with the called party, generating, by the call router, a message to be returned to the first provider corresponding to the calling party, wherein the message indicates that the connection with the called party was not established
receiving, from the first provider, a second request to establish a connection with the called party;
attempting, by the one or more processors, to establish the connection attempt with the called party;

receiving, from a called party provider corresponding to the called party, at least one cause code indicating that the connection could not be established; and causing, by the one or more processors, information corresponding to the failure to establish the connection to be stored in a cache of signaling information, wherein the ingress call filter utilizes the information corresponding to the failure to generate the indication that the connection with the called party is to be filtered, and wherein the information corresponding to the failure includes at least one cause code.

2. The method of claim 1 wherein the indication received from the ingress call filter includes:

a proprietary cause code indicating a reason that the connection was not established.

3. The method of claim 1, further comprising:

determining that the first provider is one of a pre-determined number of providers for which calls are not filtered.

4. The method of claim 3, wherein determining that the first provider is one of the pre-determined number of providers includes querying a list of providers stored on a data storage device, wherein the list of providers indicates the pre-determined number of providers for which calls are not filtered.

5. The method of claim 1, wherein multiple cause codes are received from the called party provider corresponding to the called party, and wherein causing information corresponding to the failure to be stored in the cache of signaling information includes, based on a prioritization of cause codes, causing only one of the cause codes to be stored in the cache of signaling information.

6. A method comprising:

providing a call router configured to perform the method of claim 1;

obtaining, by an ingress call filter of a private packet network backbone exchange connected to a plurality of vendor networks, cached signaling information indicative of a plurality of calls, wherein each of the plurality of calls failed to connect to a respective called party;

receiving, at the ingress call filter from the call router, a query indicating a newly called party, wherein the query corresponds to a request from a calling party to establish a new call between the calling party and the newly called party;

in response to receiving the query, analyzing, by the ingress call filter, the received cached signaling information to determine if the newly called party is indicated in a call record included in the received cached signaling information; and when the newly called party is included in a call record generating, by the ingress call filter, an indication that the new call should not be completed, wherein the indication is communicated to the computer device configured to route calls such that the new call does not reach a vendor network of the plurality of vendor networks associated with the newly called party.

7. The method of claim 6, wherein at least some of the plurality of calls failed to connect to the respective called parties because each of the respective called parties corresponds to an invalid phone number, and wherein determining if the newly called party is indicated in the call record included in the received cached signaling information includes determining if a phone number corresponding to the newly called party is invalid as indicated in the call record included in the received cached signaling information.

8. The method of claim 7, wherein the invalid phone number corresponding to each of the respective called parties is an unallocated number.

9. The method of claim 7, wherein the invalid phone number corresponding to each of the respective called parties is a previously called phone number which returned at least one of a user busy, no user responding, call rejected, or destination out of order cause code following an attempted connection to the previously called phone number.

10. The method of claim 6, wherein obtaining the cached signaling data includes periodically obtaining the cached signaling information.

11. The method of claim 6, wherein obtaining the cached signaling data includes obtaining the cached signaling data in response to a trigger event.

12. The method of claim 6, wherein the indication that the new call should not be completed includes an industry-standard cause code.

13. The method of claim 12, wherein the industry-standard cause code is at least one of an ISUP cause code or a SIP release code.

14. The method of claim 6, wherein the indication that the new call should not be completed includes a proprietary cause code.

15. A system for filtering calls that are likely to fail, the system comprising:

a private packet network backbone exchange including:

a data storage unit storing information indicative of a plurality of calls, wherein each of the plurality of calls failed to connect to a respective called party, and wherein the data storage unit stores a portion of the information indicative of the plurality of calls corresponding to each of the plurality of calls for a length of time indicated by a respective time-to-live value before the portion is removed from the data storage unit;

an access mechanism to access the information indicative of the plurality of calls stored on the data storage unit; and a call router communicatively coupled to an ingress call filter and a plurality of vendor networks and configured to perform the method of claim 10;

the ingress call filter configured to:

obtain, from the data storage unit, the stored information indicative of a plurality of calls;

receive, from the call router, a query indicating a newly called party, wherein the query corresponds to a request from a calling party to establish a new call between the calling party and the newly called party;

in response to receiving the query, analyze the obtained information indicative of a plurality of calls to determine if the newly called party is indicated in a call record included in the received cached signaling information; and when the newly called party is included in a call record, generate, an indication that the new call should not be completed, wherein the indication is communicated to the call router such that the new call does not reach a vendor network of the plurality of vendor networks associated with the newly called party.

16. A system for filtering calls that are likely to fail, the system comprising:

a private packet network backbone exchange including:

a data storage unit storing information indicative of a plurality of calls, wherein each of the plurality of calls failed to connect to a respective called party, and wherein the data storage unit stores a portion of the information indicative of the plurality of calls corresponding to each of the plurality of calls for a length of time indicated by a respective time-to-live value before the portion is removed from the data storage unit;

an access mechanism to access the information indicative of the plurality of calls stored on the data storage unit; and an ingress call filter configured to, upon receiving queries from a call router, access, by the access mechanism, the information indicative of the plurality of calls to determine whether attempted connections routed by the call router are to be filtered;

the call router communicatively coupled to the ingress call filter and a plurality of vendor networks, the call router configured to:

receive, from a call provider corresponding to a calling party, a request to establish a connection with a particular called party based on the request, generate a particular query to be transmitted to the ingress call filter, wherein the particular query indicates the particular called party;

in response to transmitting the particular query to the ingress call filter, receive, from the ingress call filter, an indication that the connection with the particular called party is to be filtered;

based on the indication that the connection with the particular called party is to be filtered, prevent the request from being routed onto a vendor network of the plurality of vendor networks associated with the called party, and (ii) generate a message to be transmitted to the call provider, wherein the message indicates that the connection with the particular called party was not established receive, from the call provider, a second request to establish a connection with the particular called party;

attempt to establish the connection attempt with the particular called party;

receive, from a call provider corresponding to the called party, at least one cause code indicating that the connection could not be established; and cause information corresponding to the failure to establish the connection to be stored in the data storage unit, wherein the ingress call filter utilizes the information corresponding to the failure to generate the indication that the connection with the called party is to be filtered, and wherein the information corresponding to the failure includes at least one cause code.

17. The system of claim 16, wherein at least one of the time-to-live values corresponding to the plurality of calls is different from other of the time-to-live values.

18. The system of claim 17, wherein the call router routes calls originating from a plurality of providers including the provider corresponding to the calling party, wherein a first subset of the time-to-live values corresponds to calls originating from a first provider of the plurality of providers, wherein a second subset of the time-to-live values corresponds to calls originating from a second provider of the plurality of providers, and wherein the first subset of time-to-live values differs from the second subset of time-to-live values.

19. The system of claim 17, wherein the first subset of time-to-live values includes a first time-to-live value corresponding to a first cause code and a second time-to-live value corresponding to a second cause code, and wherein the first time-to-live value is different from the second time-to-live value.

20. The system of claim 17, wherein the information indicative of the plurality of calls includes a first portion of information corresponding to a first failed call that returned a first cause code and a second portion of information corresponding to a second failed call that returned a second cause code different than the first cause code, and wherein a first time-to-live value corresponding to the first portion of information is different than a second time-to-live value corresponding to the second portion of information.

21. The system of claim 16, wherein the time-to live value is determined prior to receiving the request to establish a connection with the particular party.

22. The system of claim 16, wherein the time-to-live value is determined dynamically in response to receiving the request to establish a connection with the particular party.

* * * * *